(12) United States Patent
Feldotte et al.

(10) Patent No.: US 12,523,519 B2
(45) Date of Patent: Jan. 13, 2026

(54) METHOD OF OPERATING A BALANCE WITH IONIZER

(71) Applicant: SARTORIUS LAB INSTRUMENTS GMBH & CO. KG, Goettingen (DE)

(72) Inventors: Heinrich Feldotte, Goettingen (DE); Heyko Holst, Goettingen (DE); Winfried Graf, Goettingen (DE); Olaf Dudda, Goettingen (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 278 days.

(21) Appl. No.: 18/454,322

(22) Filed: Aug. 23, 2023

(65) Prior Publication Data

US 2023/0392974 A1    Dec. 7, 2023

Related U.S. Application Data

(63) Continuation of application No. PCT/EP2022/052666, filed on Feb. 4, 2022.

(30) Foreign Application Priority Data

Feb. 23, 2021   (DE) ..................... 10 2021 104 307.7

(51) Int. Cl.
*G01G 7/06* (2006.01)
*G01G 3/14* (2006.01)
*G01G 21/28* (2006.01)

(52) U.S. Cl.
CPC ................ *G01G 7/06* (2013.01); *G01G 3/14* (2013.01); *G01G 3/1414* (2013.01); *G01G 21/28* (2013.01); *G01G 21/286* (2013.01)

(58) Field of Classification Search
CPC ....... G01G 3/1414; G01G 7/06; G01G 21/286
(Continued)

(56) References Cited

U.S. PATENT DOCUMENTS

| 7,323,645 B2 | 1/2008 | Nufer et al. |
| 9,194,736 B2 | 11/2015 | Buehler |

(Continued)

FOREIGN PATENT DOCUMENTS

| DE | 20018310 U1 * | 3/2001 | ........... G01G 21/286 |
| DE | 202008017708 U1 | 5/2010 | |

(Continued)

OTHER PUBLICATIONS

Translation DE_20018310 (Year: 2001).*

(Continued)

*Primary Examiner* — Peter J Macchiarolo
*Assistant Examiner* — Monica S Young
(74) *Attorney, Agent, or Firm* — Edell, Shapiro & Finnan, LLC

(57) ABSTRACT

A method for operating a balance includes: (a) introducing an ion cloud into a weighing chamber to bring an electrostatic charge state of a weighing sample towards an electrostatic neutral state, (b) detecting the neutral state, and (c) acquiring measured values of a weighing sensor, calculating therefrom a final weighing value representing the electrostatic neutral state, and outputting the final weighing value. When the ionizer is activated, the measured values of the weighing sensor are acquired, preliminary weighing values are calculated from the measured values and the final weighing value is calculated and output after a number of preliminary weighing values have been recognized as stable. During a recognition phase, positive and negative ion clouds are alternatingly generated, and during a neutralization phase, only ion clouds of that sign are generated that, in the recognition phase, had led to the larger changes within the preliminary weighing values.

9 Claims, 3 Drawing Sheets

(58) Field of Classification Search
USPC ........................................................ 177/180
See application file for complete search history.

(56) References Cited

U.S. PATENT DOCUMENTS

| | | | |
|---|---|---|---|
| 9,293,894 B2* | 3/2016 | Suzuki | .................... H01T 23/00 |
| 2002/0162387 A1* | 11/2002 | Lavallee | ............ G01N 15/0893 |
| | | | 73/73 |
| 2013/0068542 A1* | 3/2013 | Izumo | .................. G01G 21/286 |
| | | | 177/25.12 |
| 2014/0202775 A1* | 7/2014 | Buhler | .................. G01G 21/28 |
| | | | 177/180 |
| 2014/0250980 A1* | 9/2014 | Hentz | ...................... G01G 3/16 |
| | | | 73/31.07 |
| 2016/0252389 A1* | 9/2016 | Esser | ...................... H01L 21/67 |
| | | | 177/25.13 |

FOREIGN PATENT DOCUMENTS

| | | | | |
|---|---|---|---|---|
| DE | 102013103031 A1 | | 10/2013 | |
| EP | 1813920 B1 | | 1/2006 | |
| EP | 2757354 A1 | * | 7/2014 | ............. G01G 23/01 |
| JP | 2010190600 A | * | 9/2010 | |
| JP | 2010540952 A | * | 12/2010 | ............. G01G 23/00 |
| JP | 2016173308 A | * | 9/2016 | |
| WO | WO-2016025108 A1 | * | 2/2016 | ............. H01T 23/00 |

OTHER PUBLICATIONS

International Search Report, PCT/EP2022/052666, Apr. 6, 2022, 3 pages.
International Preliminary Report on Patentability, PCT/EP2022/052666, Oct. 19, 2022, 6 pages.

* cited by examiner

METHOD OF OPERATING A BALANCE WITH IONIZER

CROSS-REFERENCE TO RELATED APPLICATION

This is a Continuation of International Application PCT/EP2022/052666, which has an international filing date of Feb. 4, 2022, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2021 104 307.7 filed on Feb. 23, 2021.

FIELD OF INVENTION

The invention relates to a method for operating a balance with a weighing sample receptacle arranged in a weighing chamber for receiving weighing samples, a weighing sensor mechanically connected to the weighing sample receptacle, an ionizer, with which an ion cloud can be introduced into the weighing chamber, and weighing electronics controllingly connected to the weighing sensor and to the ionizer, comprising:
    introducing, via the ionizer, an ion cloud into the weighing chamber in order to bring an actual electrostatic charge state of the weighing sample closer to an electrostatic neutral state of the weighing sample,
    detecting the electrostatic neutral state achieved within specified tolerances, and
    acquiring measured values of the weighing sensor, calculating therefrom a final weighing value representative for the electrostatic neutral state, and outputting the final weighing value,
wherein, when the ionizer is activated, the measured values of the weighing sensor are acquired on an ongoing basis, preliminary weighing values are calculated on an ongoing basis from the consecutively acquired measured values and the final weighing value being calculated and output after a predetermined number of consecutively calculated preliminary weighing values have been recognized as stable within predetermined tolerances.

BACKGROUND

Such a method is known from JP 2016173-308 A.

Commercially available analytical balances or precision balances have a weighing receptacle for holding the weighing sample, which weighing receptacle is arranged within a weighing chamber. The weighing chamber is usually bounded on all sides by a draft shield, which draft shield has at least one openable wall element to allow the weighing sample to be positioned on the weighing receptacle. Mechanically connected to the weighing sample receptacle is a weighing sensor, with which measured values can be detected, on the basis of which measured values a weighing value corresponding to the mass of the weighing sample is calculated with weighing electronics connected to the weighing sensor. The weighing value is finally output, which is usually done by displaying this weighing value on a display of the scale.

In order to determine the mass of a weighing sample as precisely as possible and to output a reliable weighing value, all interference factors that could adversely affect the accuracy of the weighing value must be kept to a minimum during a weighing process. One of these interference factors is the presence of electrostatic charges in the weighing chamber and sometimes directly on the weighing sample itself.

Electrostatic charging of the weighing sample becomes particularly problematic when—as is usually the case—the weighing sample is weighed in a vessel made of non-conductive, i.e. electrically insulating material; this prevents the charge of the weighing sample from flowing off. The weighing receptacle itself, on the other hand, is usually made of metal and therefore does not become electrostatically charged. Instead, charges can usually be discharged via a conductive connection to the scale housing.

If an electrostatically charged weighing sample is placed on the weighing sample receptacle of a scale in a vessel made of non-conductive material, a potential difference is created between the weighing sample and the grounded parts of the scale. Due to the Coulomb force, differently charged particles attract each other, while equally charged particles repel each other. The vertical component of this force adds to the weight force acting in the vertical direction. It is therefore additionally detected by the weighing sensor and the weighing electronics and consequently distorts the calculated weighing value, which has a negative effect particularly in weighing processes with high-resolution scales.

To keep the influence of electrostatic charges on the weighing value low, it is common practice to equip scales with ionizers. Such ionizers are capable of ionizing air molecules with the aid of high-voltage electrodes. In this process, the sign of the ions generated at an electrode tip corresponds to the sign of the voltage applied to the respective high-voltage electrode. Usually, ionizers comprise at least two high-voltage electrodes and are operated in such a way that both positive and negative ions are generated. The generated ions form an ion cloud that spreads out in the weighing chamber. When they meet, the charges of the ion cloud can interact with and neutralize the charges of an electrostatically charged weighing sample.

Such a balance with an ionizer is known from EP 1 813 920 B1. There, the ionizer is activated on the basis of data from an electrostatic sensor, which is based on the principle of detecting influence charges or the principle of field mill influence, such an electrostatic sensor being capable of detecting the level and/or the sign of electrostatic charges of the sample to be weighed. During a weighing operation, the weighing sample is placed on the weighing sample receptacle of the scale. The electrostatic sensor is then used to determine the electrostatic charge state of the weighing sample. If the weighing sample is electrostatically charged, the data from the electrostatic sensor is transmitted to a measuring unit in the weighing electronics. This unit compares the transmitted data from the electrostatic sensor with a predefined threshold value. If this is exceeded, an action is triggered by the weighing electronics. This action can, for example, be a blocking of the further weighing process and/or an activation of the ionizer. Activating the ionizer causes an ion cloud to be generated and introduced into the weighing chamber. As a result, the electrostatic charge state of the weighing sample approaches its electrostatic neutral state due to a recombination of the charges of the ion cloud with the charges of the weighing sample. The duration and the intensity of the ionizer operation are carried out according to the determined level of the electrostatic charge of the weighing sample. The electrostatic charge of the weighing sample is then determined again by the electrostatic sensor. The ionizer is then activated again, if necessary. These steps are repeated until the electrostatic charge of the weighing sample detected by the electrostatic sensor falls below the predefined threshold value. In other words, the system detects when the electrostatic neutral state of the weighing sample is achieved—within predefined tolerances. The actual weighing process is then initiated. This means that a weighing value representative for the electrostatic neutral state of the weighing sample is calculated from the measured values detected by the weighing sensor. This weighing value is the final weighing value that is finally output.

A disadvantage of this known device is that data from a separately provided electrostatic sensor must be used to control the ionizer. This makes the control of the ionizer and thus the weighing process as a whole (time-) consuming and cost-intensive.

From the representative publication mentioned above, a balance with ionizer is known that uses the development of the weighing values during the activity of the ionizer to draw conclusions about the achievement of the electrostatic neutral state. Specifically, while the ionizer is active, measured values from the weight sensor are acquired on an ongoing basis (i.e., regularly or periodically, continuously, etc.) and converted into weighing values in a device-specific manner. These weighing values are treated as preliminary weighing values and, in particular, their development over time is observed. In the case of a highly electrostatically charged weighing sample, the effect of ionizer activity is strong and the preliminary weighing values change rapidly. As the charge of the weighing sample decreases as a result of the ionizer activity, the preliminary weighing values gradually stabilize. Achieved stability of the preliminary weighing values within specified tolerances is then interpreted as achievement of the electrostatic neutral state. The disadvantage, however, is that this approach works only with a good, at least qualitative, prior knowledge of the electrostatic state of the weighing sample. If the ionizer is "incorrectly" polarized and the charge of the weighing sample is increased as a result of ionizer activity, the preliminary weighing values will also stabilize after some time—namely, when the maximum possible electrostatic charge of the weighing sample is reached. The interpretation of the stability of the weighing values as an electrostatic neutral state suggested in the publication is then incorrect.

In EP 2 757 354 A1, which corresponds to US 2014/0202775 A1, reference is made to the advantage of a priori knowledge of the sign of the charge of the weighing sample, in particular in order to control an ionizer in such a way that it sprays the weighing sample exclusively with ions of the "correct" polarity. However, the approach of a special electrostatic sensor known from the prior art already discussed above is propagated for this purpose. With regard to its disadvantages, reference is made to what has been said above.

Also from DE 20 2008 017 708 U1 a balance with an ionizer is known, wherein this balance comprises four partial ionizers. The four partial ionizers are activated and deactivated in pairs, which is controlled by a program in the weighing electronics. The activation of the partial ionizers and their duty cycles are controlled as a function of the measured air humidity, the opening state of the draft shield and/or the signal from other sensors. No statement is made about the exact time of deactivation of all partial ionizers, only that this takes place as a function of the measured air humidity, the opening state of the draft shield and/or the signal from other sensors.

Another disadvantage of this known device is the need for a separate sensor to control the ionizer. This also makes the control of the ionizer and thus the weighing process as a whole unnecessarily (time-) consuming and cost-intensive.

SUMMARY

It is an object of the present invention to provide a method of operating a balance with an ionizer, in which the ionizer is reliably activated during the actual neutralization phase such that it produces only those ions which are capable of actually neutralizing the electrostatic charge of the sample to be weighed.

This and other objects are achieved, according to one formulation of the invention, in that, during a recognition phase, positive and negative ion clouds are alternatingly generated by the ionizer, and during a neutralization phase following this recognition phase, only an ion cloud of that sign is generated that, in the recognition phase, had led to the larger changes within the consecutively calculated, preliminary weighing values.

Preferred embodiments are the subject of the dependent claims.

As is known in principle from the prior art, another aspect of the present invention provides for measured values of the weighing sensor to be recorded when the ionizer is activated and for weighing values to be calculated from these measured values. However, initially, only preliminary weighing values are calculated when the ionizer is activated. Only when a predetermined number of preliminary weighing values calculated consecutively have been found to be stable within predetermined limits is the final weighing value calculated. It is this final weighing value that is finally output.

In this respect, this aspect of the invention makes use of the knowledge that the continuously calculated weighing value of an electrostatically charged weighing sample is unstable when it interacts with the charges of an ion cloud. This is because as soon as the charges of the ion cloud meet those of the weighing sample, they recombine, changing the prevailing Coulomb forces and thus the vertical force component that is added to the weight force acting on the weighing sample. The consecutively calculated weighing values of an electrostatically charged weighing sample change accordingly when the ionizer is activated. These changes in weighing values are used to determine the electrostatic charge state of the weighing sample. The final weighing value is to be calculated and output only when consecutively calculated preliminary weighing values have approximately asymptotically approached a stable value. This is because it can be concluded from the stability of consecutively calculated weighing values when the ionizer is activated that the weighing sample has approached its electrostatic neutral state. Consequently, the final weighing value is representative for the electrostatic neutral state of the weighing sample and is virtually unaffected by electrostatic charges on the weighing sample. The advantage of this approach is that there is no need for an extra sensor to detect electrostatic charges on the weighing sample. Doing away with the sensor makes the process simpler and less expensive. In addition, the weighing process is shortened compared to other methods known in the prior art, namely by eliminating the steps of data acquisition by a sensor and evaluation and reaction to the sensor data.

Usually, positive and negative ions are always generated simultaneously by the ionizer. This ensures a charge balance of the ion cloud migrating to the weighing sample.

According to one aspect of the invention, however, positive and negative ion clouds are generated alternatingly by the ionizer during a detection phase. Then, during a neutralization phase following the detection phase, only an ion cloud of that sign is generated that had led to the larger changes in the consecutively calculated preliminary weighing values in the detection phase. The ionizer is thus operated in a detection phase such that alternatingly only positive or only negative ion clouds are generated by the ionizer. In this way, the electrostatic charge state of the weighing sample, or more precisely the sign of the electrostatic charge, can be determined. If the weighing sample is (predominantly) positively charged, interaction with a negatively charged ion cloud causes greater changes in the weighing value than interaction with a positively charged ion cloud. This is because only the charges of the negatively charged ion cloud can recombine with the positive charges of the weighing sample, which leads to changes in the prevailing Coulomb forces and thus in the vertical force component that is added to the weight force acting on the weighing sample and distorting the weighing value. Conversely, if the weighing sample is (predominantly) negatively charged, introducing a positively charged ion cloud into the weighing chamber leads to greater changes in the weighing values than introducing a negatively charged ion cloud. This is because only the charges of the positively charged ion cloud can neutralize the negative charges of the weighing sample, which has a greater effect on the acting Coulomb forces and consequently on the weighing value.

In a neutralization phase that follows the detection phase, the ionizer is then operated such that only an ion cloud of that sign that led to the larger changes in the preliminary weighing values in the detection phase is generated. This means that in the neutralization phase, only ions of a certain sign are generated by the ionizer, namely the sign that does not correspond to that of the electrostatic charge of the weighing sample. Thus, only those ions are generated that are capable of neutralizing the electrostatic charge of the weighing sample. In this way, the operating time required for the ionizer to neutralize the electrostatic charge of the weighing sample is reduced and, as a result, the duration of the weighing process is shortened overall.

Preferably, after the stability of the preliminary weighing values has been detected and before the final weighing value is calculated, the ionizer is deactivated and subsequently further measured values of the weighing sensor are detected, from which further preliminary weighing values are calculated on an ongoing basis until a predetermined number of these consecutively calculated further preliminary weighing values have been recognized as stable within predetermined tolerances. The ionizer is thus deactivated as soon as consecutively calculated preliminary weighing values no longer vary. Subsequently, further preliminary weighing values are calculated on an ongoing basis until these also remain stable. Only when this is the case the final weighing value is calculated and output. Deactivating the ionizer before calculating the final weighing value has the advantage that the final weighing value is determined undisturbed by the so-called ion wind that results from the movement of the ion cloud generated by an activated ionizer. This is because even if the weighing sample has already approached its electrostatic neutral state, the ion wind still influences the weighing value—even if only in the μg range. Accordingly, when high-resolution balances are operated, a jump in load can be detected during the ongoing calculation of the further preliminary weighing values after the ionizer is deactivated. Because the final weighing value is calculated only after the ionizer is deactivated and after this subsequent load jump, the final weighing value output is even more precise and less influenced by interfering factors that affect the accuracy of the weighing value.

Particularly preferably, the final weighing value is calculated exclusively from the further preliminary weighing values. In other words, the final weighing value is not to be calculated from preliminary weighing values or from a combination of preliminary and further preliminary weighing values. Instead, the final weighing value is to be calculated solely from further preliminary weighing values, i.e., those weighing values that are based on the measured values of the weight sensor when the ionizer is deactivated. This ensures that only weights calculated after the load step caused by deactivating the ionizer serve as the basis for calculating the final weighing value, which further increases the precision of the final weighing value.

Ideally, the weighing chamber is bounded on all sides by an openable draft shield. The draft shield enables more precise determination of the weighing value, unaffected by environmental influences such as drafts.

Preferably, the ionizer is activated by opening the draft shield when the weighing sample receptacle is unloaded. This means that the ionizer is activated when the draft shield is opened and at the same time no load is registered on the weighing sample receptacle. If the ionizer is activated when the draft shield is opened while the weighing sample receptacle is free of weighing samples, electrostatically charged weighing samples can be discharged by the ion cloud generated by the ionizer as they are introduced into the weighing chamber, i.e., before they are deposited on the weighing sample receptacle. In this way, the total time required for the weighing process can be further reduced.

Alternatively, the ionizer can be activated by loading the weighing sample receptacle. In this case, the ionizer is activated by registering a weight or load on the weighing sample receptacle. This has the advantage that the ionizer is only started up when it is really needed-namely when a weighing sample is actually weighed. In this way, the operating time of the ionizer is shortened and, as a consequence, the waste heat generated by the power dissipation of the ionizer in its activated state is reduced. The latter is favorable from a weighing standpoint in that the waste heat from the ionizer can cause undesirable convection currents in the weighing chamber that distort the weighing value.

The ionizer can also be activated by the signal from a proximity sensor that crosses a charging path. In this context, the charging path is to be understood as the path that the weighing sample has to take when the balance is operated as intended, in order to be introduced into a weighing chamber that may be separated from the surroundings by an openable draft shield, and to be placed on the weighing sample receptacle. Activation of the ionizer by the signal from such a proximity sensor is a simple variant to implement. For example, the sensor can be designed as an inductive or an optical proximity sensor (e.g., in the form of a light barrier). Depending on the arrangement of the proximity sensor in the charging path, the ionizer can be activated earlier, for example when the weighing sample is introduced into the weighing chamber, or later, for example when the weighing sample is deposited on the weighing receptacle.

Alternatively, the ionizer can be activated by an actuable switch. Preferably, the switch is located outside the weighing chamber. Particularly preferably, the switch may be arranged in an operating unit for manual or otherwise selective input (for example, with the foot) of control commands for balance operation. This allows a user of the method according to the invention to carry out the activation of the ionizer without assistance, if desired.

In a preferred further development of the invention, the ionizer is switched on and off in a pulsed manner in its activated state, and correction terms for mathematical correction of the final weighing value are determined from changes in consecutively calculated, preliminary weighing values occurring when the ionizer is switched off. The activated ionizer is thus switched on and off alternatingly. If changes occur in consecutive preliminary weighing values even when the ionizer is switched off, it can be concluded that, in addition to the electrostatic charge of the weighing sample, other interfering factors are influencing the accuracy of the weighing value. This is because no ion cloud is generated when the ionizer is switched off. Accordingly, no ion cloud can migrate to the weighing sample during this period and recombine with the electrostatic charges of the weighing sample. Consequently, when the ionizer is switched off, the prevailing Coulomb forces do not change and the magnitude of the vertical component of this force, which adds to the weight force acting in the vertical direction and distorts the weighing value, remains the same. Accordingly, any changes in the preliminary weighing values that occur despite the ionizer being switched off must result from other influencing factors, such as temperature fluctuations, material creep of the weighing sensor or air convection. To ensure that a final weighing value that is as reliable as possible may be output, correction terms are determined from the described changes in the preliminary weighing values, these changes being not due to an electrostatic charge on the weighing sample and these correction terms being suitable to be used to mathematically correct the final weighing value.

Further details and advantages of the invention will be apparent from the following specific description and drawings.

DESCRIPTION

Figure 1:
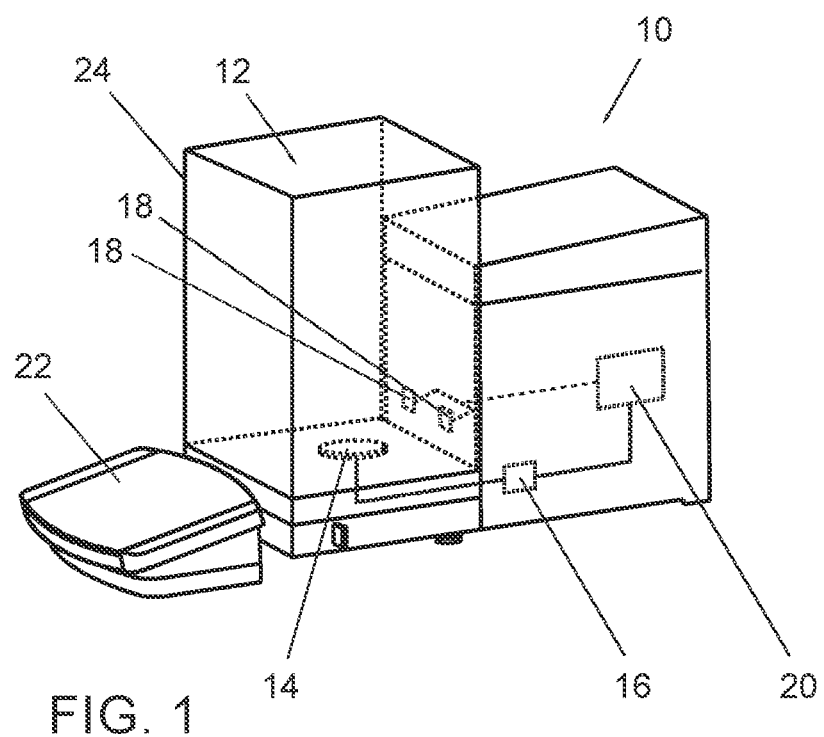
FIG. 1: a schematic representation of a balance for carrying out the method according to the invention.

In order to be able to carry out the method for operating a balance according to the invention, a balance is required which has certain features. An example of such a balance suitable for carrying out the method according to the invention is shown in FIG. 1. The balance 10 of FIG. 1 comprises a weighing chamber 12—which is not absolutely necessary for the invention, but is advantageous—which is bounded on all sides by a draft shield 24. In the weighing chamber 12 there is a weighing sample receptacle 14 on which a weighing sample to be weighed can be positioned. In order for the weighing sample to be able to be introduced into the weighing chamber 12 bounded by the draft shield 24 and to be deposited on the weighing sample receptacle 14, the draft shield 24 has at least one openable wall element, for example an openable side wall. The weighing receptacle 14 arranged in the weighing chamber 12 is mechanically connected to a weighing sensor 16, which in turn is connected to an electronic weighing system 20. Using the weighing sensor 16, measured values are recorded, with which the weighing electronics 20 calculate weighing values, which correspond to the mass of the sample to be weighed. The balance 10 further comprises a display 22, on which weighing values can be output and displayed. In addition, the balance 10 comprises an ionizer 18 configured to introduce an ion cloud into the weighing chamber 12.

Figure 2:
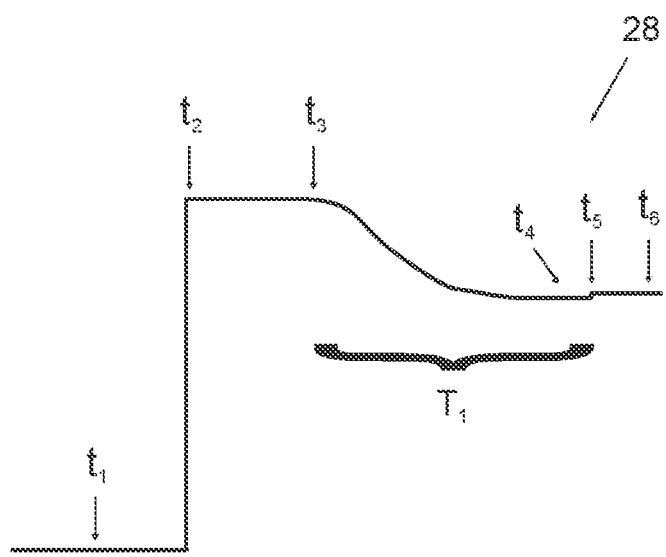
FIG. 2: a first exemplary curve of weighing values during operation of a balance with ionizer according to the invention as shown in FIG. 1, FIG. 3A: a second exemplary curve of weighing values during operation of a balance according to the invention with the ionizer switched on and off in a pulsed mode.

FIG. 2 shows a first exemplary curve of weighing values 28 during operation of a balance 10 with an ionizer 18 as shown in FIG. 1. In FIG. 2, a stable zero value can initially be seen at the time $t_1$, with unloaded weighing sample receptacle 14. At the moment $t_2$, when the weighing sample is placed on the weighing sample receptacle 14, there is a clear jump in load. When the weighing sample is placed on the weighing sample receptacle 14, the weighing sensor 16 begins to produce measured values from which preliminary weighing values are calculated on an ongoing basis by the weighing electronics 20. The measured values of the weighing sensor 16 are preferably recorded when it is registered that the weighing sample receptacle 14 is loaded and the draft shield 24 is closed. However, the recording of the measured values can also be started solely by the loading of the weighing sample receptacle 14 or the closing of the draft shield 24.

At time $t_3$ the ionizer 18 is activated. In the present example, the ionizer 18 is switched on permanently in its activated state (time period $T_1$), with both positive and negative ions being generated simultaneously. In a situation with electrostatically charged weighing sample 18 activation of the ionizer is noticeable by a time-dependent change in the weighing values, or more precisely, the preliminary weighing values decrease with time. This is due to the fact that an ion cloud is generated by the ionizer 18, which is introduced into the weighing chamber 12, where the charges of the ion cloud recombine with those of the weighing sample to be weighed. The recombination, in turn, causes a change in the prevailing Coulomb forces and thus a change in the vertical force component that acts on the weighing sample receptacle 14 in addition to the weight force acting on the weighing sample, which is also detected by the weighing sensor 16. FIG. 2 shows how a possible weighing value curve 28 looks if the loading of the weighing sample receptacle 14 (time $t_2$) and the activation of the ionizer 18 (time $t_3$) occur at different times, or more precisely, if the activation of the ionizer 18 occurs only after the loading of the weighing sample receptacle 14. This selected example serves only to illustrate the effect of ionizer activation on the weighing value curve 28. Preferably, the ionizer 18 is already activated by the opening of the draft shield 24 when the weighing sample receptacle 14 is still unloaded or by the signal of a proximity sensor that crosses a charging path—i.e., before the weighing product receptacle 14 is loaded. Similarly, the ionizer 18 can be activated by loading the weighing sample receptacle 14 (i.e., simultaneously with loading the weighing sample receptacle 14) or by actuating a switch.

When the ionizer 18 is activated (time period $T_1$), the electrostatic charge state of the electrostatically charged weighing sample thus approaches its electrostatic neutral state, which is indicated by changes in the preliminary weighing values. Accordingly, when the electrostatic neutral state of the weighing sample is reached within predetermined tolerances, this is recognized by the fact that a predetermined number of consecutive, preliminary weighing values remain stable, as is the case in FIG. 2 at time $t_4$.

In FIG. 2, a smaller load jump can also be seen at time is after the stability of the preliminary weighing values has been established. This results from deactivation of the ionizer 18, because even if the electrostatic charge of the weighing sample is already in its neutral state and the charges of the ion cloud generated by the ionizer 18 no longer interact with the charges of the weighing sample, the ion wind generated by the ionizer 18 still has an undesirable, distorting effect on the calculated weighing values.

In order not to include this effect on the weighing value calculation, after deactivation of the ionizer 18 at time $t_5$, as shown in FIG. 2, further preliminary weighing values are preferably calculated on an ongoing basis until, as at time $t_6$, a predetermined number of these consecutively calculated further preliminary weighing values remains stable within predetermined limits. Only then is the final weighing value calculated and output—ideally exclusively from the further preliminary weighing values.

Figure 3A:
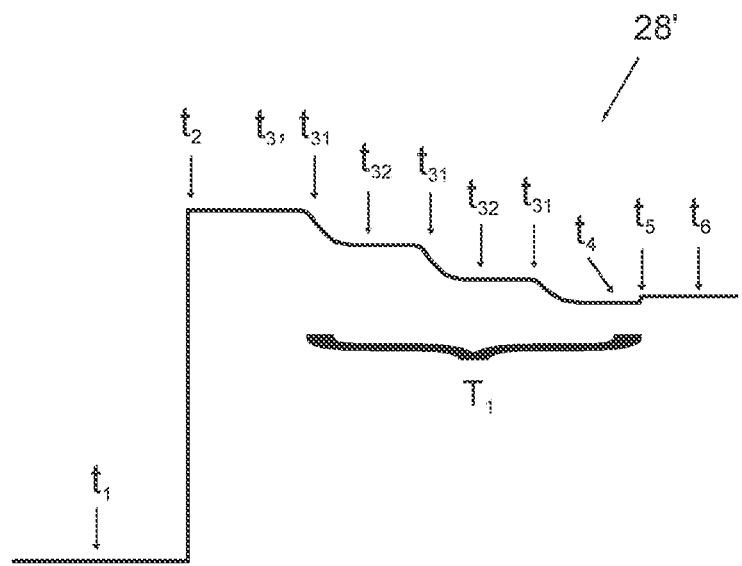
FIG. 3B: a third exemplary curve of weighing values during operation of a balance according to the invention with the ionizer switched on and off in pulsed mode.

FIG. 3A shows a second exemplary course of weighing values 28' during operation of the balance 10 with ionizer 18. Reference signs which correspond to those in FIG. 2 correspond to the points in time or time periods there. In contrast to FIG. 2, FIG. 3A shows a weighing value curve 28' in which the ionizer 18 is switched on and off in a pulsed manner in its activated state (time period $T_1$). In FIG. 3A, the times at which the ionizer is switched on are indicated by tai and those at which the ionizer is switched off by $t_{32}$. If—as shown in FIG. 3A—the electrostatic charge state of the weighing sample is the only interfering factor present in the weighing chamber 12 that affects the accuracy of the weighing value, the consecutively calculated, preliminary weighing values change only when the ionizer 18 is switched on, but not when it is switched off.

Figure 3B:
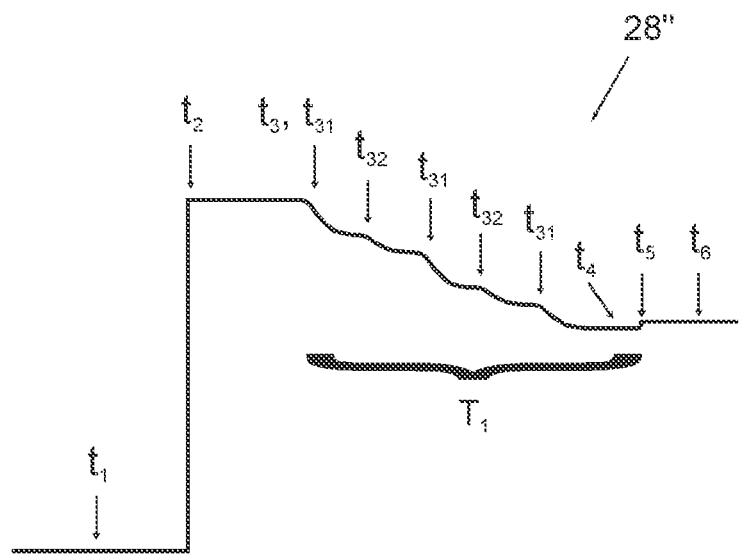

If, on the other hand—as shown in the weighing sample weighing value curve 28" in FIG. 3B—at least one other interference factor is present in the weighing chamber 12 in addition to the electrostatic charge of the weighing sample, which impairs the precise determination of the mass of the weighing sample (e.g., temperature fluctuations), changes in consecutively calculated, preliminary weighing values can be detected even with the ionizer 18 switched off. In order to minimize the influence of these additional disturbing factors on the final weighing value, the method described here determines correction terms from the changes in the weighing value when the ionizer 18 is switched off, which can be used to mathematically correct the final weighing value.

Figure 4:
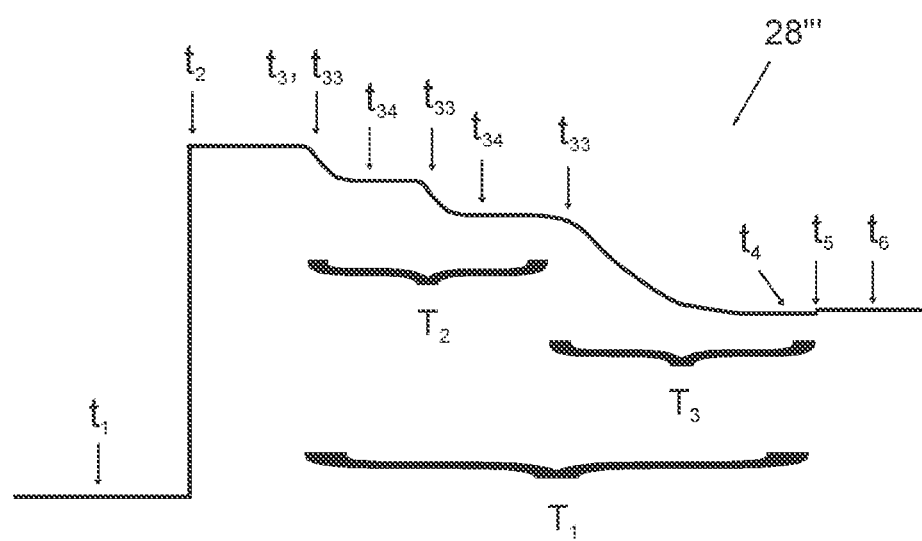
FIG. 4: a fourth exemplary curve of weighing values during operation of a balance according to the invention, comprising a detection phase and a neutralization phase.

Finally, FIG. 4 shows a fourth exemplary sequence of weighing values 28''' during operation of a balance 10 with ionizer 18. Here, the ionizer operation is divided into a detection phase (time period $T_2$) and a neutralization phase (time period $T_3$). In the detection phase $T_2$, initially only positive or only negative ion clouds are alternatingly generated by the ionizer 18 and introduced into the weighing chamber 12. The times at which only positive ions are generated are marked $t_{33}$; the times at which only negative ions are generated are marked $t_{34}$. In the example shown, the weighing sample is predominantly negatively electrostatically charged, so introducing positively charged ion clouds into weighing chamber 12 causes greater changes in the preliminary weighing values than introducing negatively charged ion clouds. The electrostatic charge state of the weighing sample is detected by the weighing electronics 20 based on this difference in the weight reading 28'''. Accordingly, in the neutralization phase $T_3$, which follows the detection phase $T_2$, only an ion cloud of that sign is generated by the ionizer 18 which is opposite to the electrostatic charge state of the weighing sample. In this way, the neutralization of the electrostatic charge of the weighing sample can be further accelerated, thereby beneficially reducing the total duration of the weighing process.

The embodiments discussed in the specific description and shown in the figures are only illustrative examples of embodiments of the present invention. The person skilled in the art is provided with a wide range of possible variations in light of the present disclosure. The applicant seeks, therefore, to cover all such variations as fall within the spirit and scope of the invention, as defined by the appended claims, and equivalents thereof.

LIST OF REFERENCE SIGNS 10 balance
12 weighing chamber
14 weighing sample receptacle
16 weighing sensor
18 ionizer
20 weighing electronics
22 display
24 draft shield
28, 28', 28", 28''' weighing value curve
$t_1$ zero value with unloaded weighing sample receptacle
$t_2$ weighing value when the load receptacle is loaded
$t_3$ weighing value curve when activating the ionizer
$t_{31}$ weighing value curve with ionizer switched on
$t_{32}$ weighing value curve with ionizer switched off
$t_{33}$ weighing value curve when positively charged ion clouds are introduced into the weighing chamber
$t_{34}$ weighing value curve when negatively charged ion clouds are introduced into the weighing chamber.
$t_4$ weighing value curve when the weighing sample reaches the electrostatic neutral state
$t_5$ weighing value curve when deactivating the ionizer
$t_6$ weighing value curve after deactivating the ionizer
$T_1$ weighing value curve when the ionizer is activated
$T_2$ detection phase
$T_3$ neutralization phase

What is claimed is:

1. A method for operating a balance having:
   a weighing sample receptacle arranged in a weighing chamber for receiving a weighing sample,
   a weighing sensor mechanically connected to the weighing sample receptacle,
   an ionizer configured to introduce positive and negative ion clouds into the weighing chamber, and
   weighing electronics controllingly connected to the weighing sensor and to the ionizer, the method comprising:
      neutralizing the weighing chamber by bringing the weighing sample from an actual electrostatic charged state toward an electrostatic neutral state, by activating the ionizer to introduce the ion clouds into the weighing chamber, wherein said neutralizing comprises a recognition phase followed by a neutralization phase,
         wherein during the recognition phase:
            the positive and the negative ion clouds are alternatingly introduced,
            measured values of the weighing sensor are acquired on an ongoing basis and preliminary weighing values are calculated from the acquired measured values on an ongoing basis, and a determination of whether the positive ion clouds or the negative ion clouds lead to larger changes within the preliminary weighing values, and wherein during the neutralization phase:

in accordance with said determination during the recognition phase, only ion clouds that are only positive or are only negative are introduced;

detecting the electrostatic neutral state, within specified electrostatic tolerances, achieved by the ion clouds, wherein said detecting of the electrostatic neutral state comprises recognizing a predetermined number of the preliminary weighing values as stable within predetermined weighing-value tolerances, calculating from the measured values a final weighing value representative of the electrostatic neutral state, and outputting the final weighing value.

2. The method according to claim 1, further comprising:

after recognizing the preliminary weighing values as being stable and before calculating the final weighing value, deactivating the ionizer and, subsequently, detecting further measured values of the weighing sensor, calculating further preliminary weighing values on an ongoing basis until a predetermined number of consecutively calculated further preliminary weighing values have been recognized as stable within the predetermined tolerances.

3. The method according to claim 2, wherein the final weighing value is calculated exclusively from the further preliminary weighing values.

4. The method according to claim 1, wherein the weighing chamber is bounded on all sides thereof by a draft shield configured to open and close the weighing chamber.

5. The method according to claim 4, wherein opening the draft shield to unload the weighing sample receptacle activates the ionizer.

6. The method according to claim 1, wherein loading the weighing sample receptacle activates the ionizer.

7. The method according to claim 1, wherein detecting a signal of a proximity sensor triggered by crossing a charging path activates the ionizer.

8. The method according to claim 1, wherein actuating a switch activates the ionizer.

9. The method according to claim 1, wherein said activating the ionizer comprises switching the ionizer on and off in a pulsed manner and said acquiring measured values comprises determining correction terms for mathematical correction of the final weighing value from changes in consecutively calculated preliminary weighing values occurring when the ionizer is switched off.

* * * * *